US012718032B2

(12) United States Patent
Zhao et al.

(10) Patent No.: US 12,718,032 B2
(45) Date of Patent: Aug. 25, 2026

(54) WORD-TAG-BASED LANGUAGE SYSTEM FOR SENTENCE ACCEPTABILITY JUDGMENT

(71) Applicant: International Business Machines Corporation, Armonk, NY (US)

(72) Inventors: Yang Zhao, Tokyo (JP); Issei Yoshida, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 17/961,542

(22) Filed: Oct. 6, 2022

(65) Prior Publication Data

US 2024/0119239 A1 Apr. 11, 2024

(51) Int. Cl.
*G06F 40/51* (2020.01)
*G06F 40/44* (2020.01)

(52) U.S. Cl.
CPC .............. *G06F 40/51* (2020.01); *G06F 40/44* (2020.01)

(58) Field of Classification Search
CPC ......... G06F 40/51; G06F 40/44; G06F 40/284
See application file for complete search history.

(56) References Cited

U.S. PATENT DOCUMENTS 9,396,723 B2 7/2016 Lu
2014/0122056 A1* 5/2014 Duan ...................... H04L 51/02 704/9
2020/0020325 A1* 1/2020 Nam ..................... G06F 16/322
2021/0110119 A1 4/2021 Ryan
2022/0254353 A1* 8/2022 Kroehl ............. G01N 35/00584
2023/0255553 A1* 8/2023 Weston ................ A61B 5/7264 600/586

FOREIGN PATENT DOCUMENTS

CN 108417210 B 6/2020

OTHER PUBLICATIONS

Bernardy et al. ("Using deep neural networks to learn syntactic agreement." Linguistic Issues in Language Technology (2017), https://aclanthology.org/2017.lilt-15.3.pdf) (Year: 2017).*

(Continued)

*Primary Examiner* — Pierre Louis Desir
*Assistant Examiner* — Keisha Y. Castillo-Torres
(74) *Attorney, Agent, or Firm* — CHIP LAW GROUP

(57) ABSTRACT

Methods and systems for sentence acceptability judgment. A word frequency distribution for a predetermined textual data set is obtained. A replacement rate is determined based on an obtained word frequency distribution for a predetermined textual data set and every occurrence of a word having a frequency lower than the replacement rate is replaced in text of a training data set with a corresponding tag to generate revised text of the training data set (the training data set comprising at least a portion of the predetermined textual data set). A plurality of language models are trained with the revised text and a best performing trained language model of the plurality of trained language models is selected. An acceptability of each sentence of a plurality of candidate sentences is rated using the selected trained language model and a best sentence of the plurality of candidate sentences is selected based on the ratings.

20 Claims, 3 Drawing Sheets

(56) References Cited

OTHER PUBLICATIONS

Warstadt et al. ("Neural network acceptability judgments." Transactions of the Association for Computational Linguistics 7 (2019): 625-641. https://aclanthology.org/Q19-1040.pdf) (Year: 2019).*
Wagner et al. ("Judging grammaticality: Experiments in sentence classification." Calico Journal 26.3 (2009): 474-490. https://doras.dcu.ie/15662/1/Wagner_judging09.pdf) (Year: 2009).*
A Dataset and Evaluation Metrics for Abstractive Compression of Sentences and Short Paragraphs. Proceedings of the 2016 Conference on Empirical Methods in Natural Language Processing (EMNLP 2016), pp. 340-350.
Language Modeling with Syntactic and Semantic Representation for Sentence Acceptability Predictions. In proceedings of the 22nd nordic conference on computational linguistics, pp. 1-10, Sep. 2019.
Neural Network Acceptability Judgments. Sep. 1, 2019. Transactions of the Association for Computational Linguistics (TACL 2019), vol. 7, pp. 625-641.
Sentence-Level Fluency Evaluation—References Help, But Can Be Spared! Proceedings of the 22nd Conference on Computational Natural Language Learning (CoNLL 2018), pp. 313-323.
Unsupervised Prediction of Acceptability Judgements. Proceedings of the 53rd Annual Meeting of the Association for Computational Linguistics (ACL 2015), vol. 01, pp. 1618-1628,.
Peter Mell and Timothy Grance, The NIST Definition of Cloud Computing, NIST Special Publication 800-145, Sep. 2011, cover, pp. i-iii and 1-3.

* cited by examiner

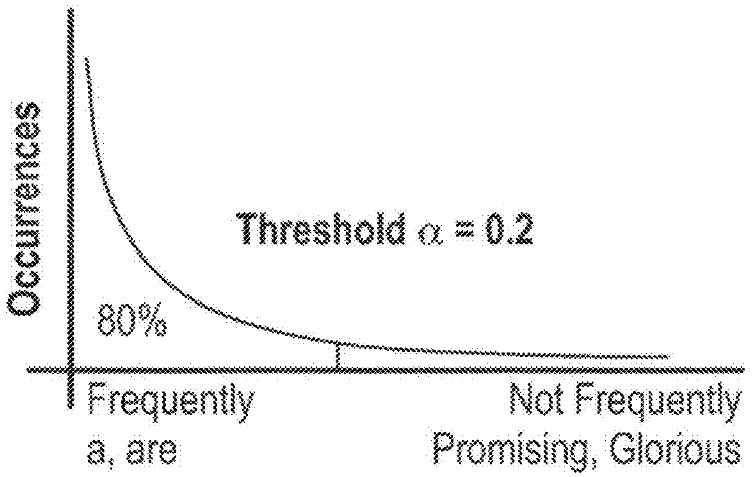

204 — Obtain a word frequency distribution for a predetermined textual data set

208 — Determine a replacement rate

212 — Obtain list of words, where each word has a frequency lower than the replacement rate 216 — Replace every occurrence of each word in a given text that is also in the list with its corresponding tag to generate new text T'

220 — Train and evaluate trained language model

224 — All replacement rates processed?

No → 212

Yes

228 — Select best performing language model

232 — Select best text candidate using selected language model

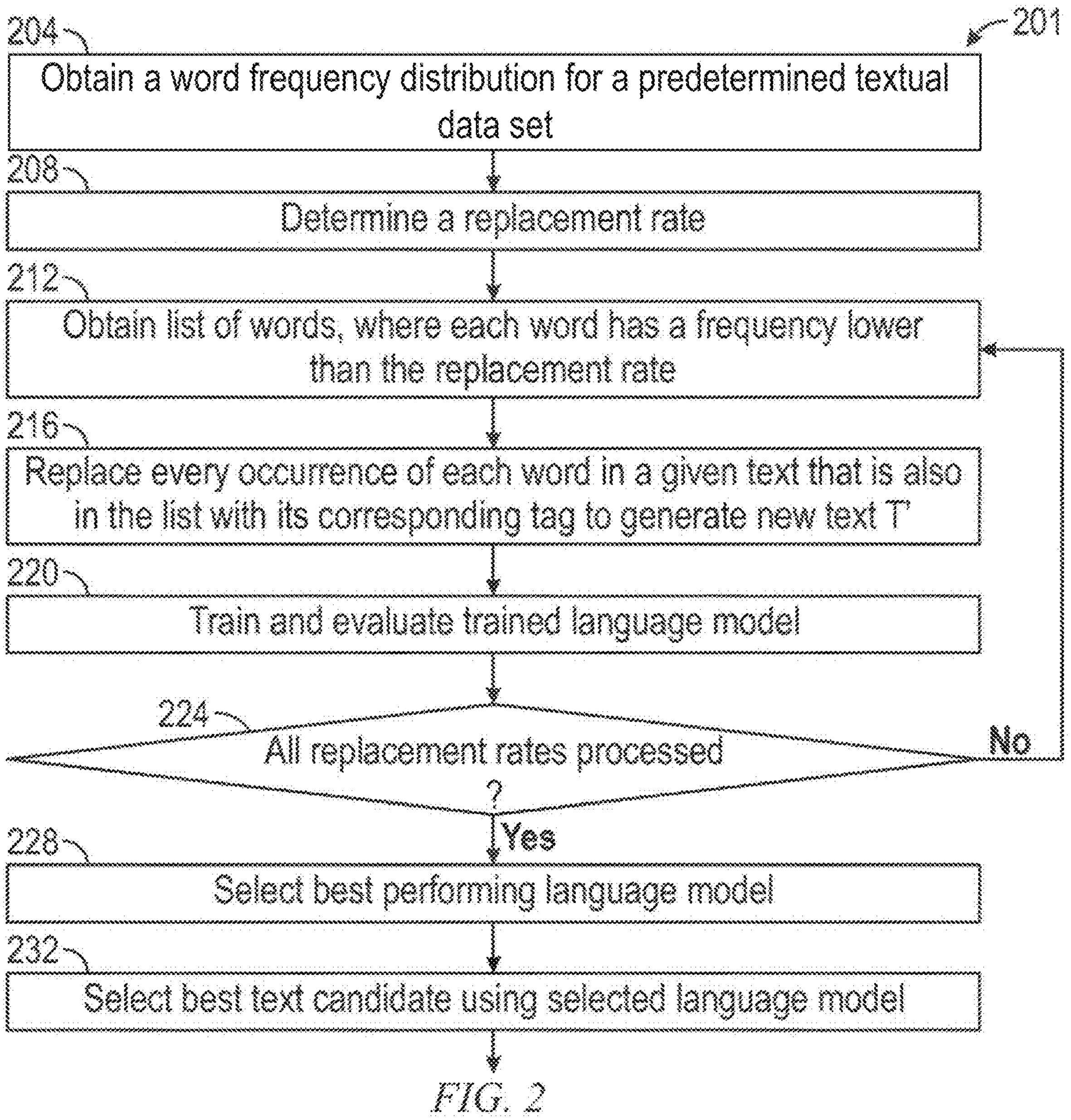

*FIG. 2*

| Word Replacement Rate α | # of Word + # of Tag (XPOS) | Pearson Correlation |
|---|---|---|
| 0% | - | 0.454 |
| 1% | 455,774 + 49 | 0.463 |
| 5% | 35,471 + 49 | 0.452 |
| 10% | 11,414 + 49 | 0.503 |
| 15% | 5,597 + 49 | 0.470 |
| 20% | 3,179 + 49 | 0.460 |
| 40% | 403 + 49 | 0.434 |
| 60% | 28 + 49 | 0.460 |
| 80% | 4 + 49 | 0.426 |
| 100% | 0 + 49 | 0.393 |

Acceptable Sentence: *Additionally, infected T cells displayed lower levels of CD45 on their surfaces.*

Unacceptable Sentences: *Additionally, infected T cells lower levels of CD45 on their surfaces.*

| Accuracy | Finance (1,000) | Law (1,000) | Medicine (1,000) |
|---|---|---|---|
| BERT | 86.8 | 86.1 | 91.4 |
| Word-tag-hybrid BERT (α=10%) | 88.6 | 89.5 | 93.8 |

WORD-TAG-BASED LANGUAGE SYSTEM FOR SENTENCE ACCEPTABILITY JUDGMENT

BACKGROUND

The present invention relates generally to the electrical, electronic and computer arts and, more particularly, to machine learning systems.

"Sentence Acceptability" is the extent to which a sentence appears acceptable, or natural, to native speakers of a language. A conventional task of natural language processing is finding a function $f_{acceptability}$ for mapping input text to a real value, where, for example, a higher score indicates more natural and fluent text. For example, $f_{acceptability}$("He is a citizen of France.")=0.9 would be indicative of natural text whereas $f_{acceptability}$("Bad whether has in Tokyo")=0.25 would be indicative of unnatural text. Conventional language model systems estimate sentence acceptability utilizing n-gram or neural language model perplexity, where it is either word-based or tag-based (e.g., a part-of-speech-based language model).

BRIEF SUMMARY

Principles of the invention provide a word-tag-based language system for sentence acceptability judgment. In one aspect, an exemplary method includes the operations of obtaining, using a hardware processor, a word frequency distribution for a predetermined textual data set, determining, using the hardware processor, a replacement rate based on the word frequency distribution, replacing, using the hardware processor, in text of a training data set, the training data set comprising at least a portion of the predetermined textual data set, every occurrence of a word having a frequency lower than the replacement rate, with a corresponding tag to generate revised text of the training data set, training, using the hardware processor, a plurality of language models with the revised text, selecting, using the hardware processor, a best performing trained language model of the plurality of trained language models, rating, using the hardware processor, an acceptability of each sentence of a plurality of candidate sentences using the selected trained language model, and selecting, using the hardware processor, a best sentence of the plurality of candidate sentences based on the ratings.

In one aspect, a non-transitory computer readable medium comprises computer executable instructions which when executed by a computer cause the computer to perform the method of obtaining a word frequency distribution for a predetermined textual data set, determining a replacement rate based on the word frequency distribution, replacing in text of a training data set, the training data set comprising at least a portion of the predetermined textual data set, every occurrence of a word having a frequency lower than the replacement rate, with a corresponding tag to generate revised text of the training data set, training a plurality of language models with the revised text, selecting a best performing trained language model of the plurality of trained language models, rating an acceptability of each sentence of a plurality of candidate sentences using the selected trained language model, and selecting a best sentence of the plurality of candidate sentences based on the ratings.

In one aspect, an apparatus comprises a memory and at least one processor, coupled to the memory, and operative to perform operations comprising obtaining a word frequency distribution for a predetermined textual data set, determining a replacement rate based on the word frequency distribution, replacing in text of a training data set, the training data set comprising at least a portion of the predetermined textual data set, every occurrence of a word having a frequency lower than the replacement rate, with a corresponding tag to generate revised text of the training data set, training a plurality of language models with the revised text, selecting a best performing trained language model of the plurality of trained language models, rating an acceptability of each sentence of a plurality of candidate sentences using the selected trained language model, and selecting a best sentence of the plurality of candidate sentences based on the ratings.

As used herein, "facilitating" an action includes performing the action, making the action easier, helping to carry the action out, or causing the action to be performed. Thus, by way of example and not limitation, instructions executing on a processor might facilitate an action carried out by another processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

- a hybrid word-tag language model (LM) that addresses drawbacks of conventional methods for a sentence acceptability judgement task;
- replacement of words with tags to alleviate the effect that low-frequency words or out-of-vocabulary words have on the LM, while maintaining semantic information of the sentence by maintaining other words of the sentence;
- empirical determination of the optimal replacement rate;
- improved performance of the sentence acceptability judgement task based on sentence acceptability benchmarks and cross-domain acceptability judgment tasks;
- language model training over a range of replacement rates;
- enables an adjustable replacement rate that generates an improved granularity-of-word and part-of-speech tag hybrid vocabulary; and
- improve the technological process of computerized natural language processing via machine learning, advantageously overcoming prior-art concerns with word-based LM perplexity suffering from low-frequency words (or OOV words), leading to high perplexity even for acceptable sentences (while tag-based LM is too coarse-grained to keep semantics information) and/or cross-domain difficulty—the prior-art problems are overcome, for example, because the out-of-vocabulary (OOV) words or low-frequency words in one or more embodiments are replaced with XPOS tags or the like but high-frequency words are kept as they are.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 1 is a graph of frequency for each word of a vocabulary;

FIG. 2 is an example method for performing joint training of a hybrid word-tag language model (LM), in accordance with an example embodiment;

Figures 3, 4A, 4B:
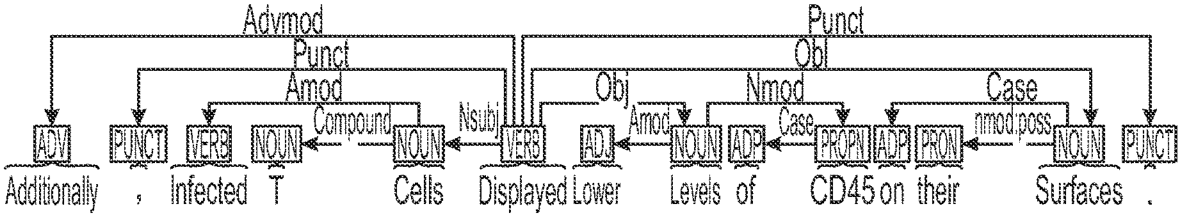
FIG. 3 illustrates the results obtained by varying the replacement rate α from 0% to 100%, in accordance with an example embodiment.
FIG. 4A illustrates an example dependency tree for natural language processing for an acceptable sentence and a corresponding unacceptable sentence, in accordance with an example embodiment.
FIG. 4B illustrates the results of the evaluation of a domain-specific sentence acceptability judgment performed on the domains of Finance, Law, and Medicine, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

As noted, "Sentence Acceptability" is the extent to which a sentence appears acceptable, or natural, to native speakers of a language. A conventional task of natural language processing is finding a function $f_{acceptability}$ for mapping input text to a real value where, for example, a higher score indicates more natural and fluent text. For example, $f_{acceptability}$("He is a citizen of France.")=0.9 would be indicative of natural text whereas $f_{acceptability}$("Bad whether has in Tokyo")=0.25 would be indicative of unnatural text (assuming a threshold of, for example, 0.75). A key question is what is the value of $f_{acceptability}$("He is a citizen of Tuvalu.")(for example)?

A number of important use cases are enabled by the ability to evaluate $f_{acceptability}$("He is a citizen of Tuvalu."), including rating the acceptability (naturalness or fluency) of a computer-generated sentence (for use in speech recognition scoring, dialogue systems, summarization systems, and the like), selecting the best text in terms of naturalness and fluency, and selecting the natural and fluent perturbated instances for a part-of-speech tagger training. (With respect to a sentence acceptability judgment task processing the above example, it is pertinent for the language model to know that, in the proper context, the words Tuvalu and France are proper nouns, whereas it may not be particularly pertinent for the language model to understand whether the location is Tuvalu or France.)

Conventional language model systems estimate sentence acceptability utilizing n-gram or neural language model perplexity, where it is either word-based or tag-based (e.g., a part-of-speech-based language model). However, two problems exist:

1) word-based language model perplexity suffers from low-frequency words (or out-of-vocabulary words), which leads to a high perplexity even for an acceptable sentence, while a tag-based language model is too coarse-grained to maintain semantic information (for example, Tuvalu, in the above example, would be designated as a rare word); and
2) cross-domain difficulty: when it comes to certain domains, such as financial, law and medicine, the continual pre-training of language models (e.g., Bidirectional Encoder Representations from Transformers (BERT)) on these specific domains is needed in order to perform domain adaptation.

Hybrid Word & Linguistic Tag Language Model

FIG. 1 is a graph of frequency for each word of a vocabulary. The words are ranked from most frequent to least frequent. As illustrated in FIG. 1, the words "a" and "are" are relatively frequent words and the words "promising" and "glorious" are relatively rare words. A replacement rate α (which may vary from 0 to 1) of 20% (0.2) is illustrated as an example rate.

FIG. 2 is an example method 201 for performing joint training of a hybrid word-tag language model (LM), in accordance with an example embodiment. The disclosed hybrid word-tag language model alleviates the low-frequency word effect in language model perplexity while maintaining semantic information. In one example embodiment, English language-specific part-of speech (XPOS) tags are used for the tag nomenclature. It is noted that other tag nomenclatures, such as Universal Part-of-speech tags (UPOS), may also be utilized.

In one example embodiment, a word frequency distribution for a predetermined textual data set is obtained (operation 204). For example, a word frequency distribution for the whole English version of a popular on-line encyclopedia (13 GB+) may be obtained. A replacement rate α is selected from a range of replacement rate values (such as a range of 0.05 to 0.35) where, for example, a replacement rate α of 0.20 indicates that 20% of the words in the distribution having the lowest word frequency are replaced with their corresponding tag (operation 208). In one example embodiment, the replacement rate is selected randomly, is selected with a minimal difference (such as a difference of 0.03), and the like. In one example embodiment, the replacement rate is based on the word frequency distribution. A list L that identifies all words in the target vocabulary whose word frequency is lower than the replacement rate α is obtained (operation 212). Given a text T, every occurrence in the text T of each word in the list L is replaced with its corresponding tag to generate new text T' (operations 216). A language model, such as a BERT model, is trained using T' and the trained language model is evaluated (operation 220). For example, the language model may be evaluated using a benchmark data set. A check is performed to determine if all replacement rates a in the range have been processed (operation 224). If all replacement rates a have not been processed (NO branch), operations 208 through 224 are repeated; otherwise (YES branch), the language model exhibiting the best performance is selected (operation 228). The selected language model is utilized to select the best text from a plurality of text candidates (operation 232). It is noted that, since tag lists exist for many languages, the method 201 may be used with a variety of languages. (It is also noted that the optimal replacement rate may vary based on the domain of the given data set, such as sports and law. It is also noted that a better performance of the method 201 may be obtained using tag nomenclatures that have a larger number of tags, such as XPOS.)

For example, consider the text T:

The liver is an organ only found in vertebrates which detoxifies various metabolites, synthesizes proteins and produces biochemicals necessary for digestion and growth. In humans, it is located in the right upper quadrant of the abdomen, below the diaphragm. Its other roles in metabolism include the regulation of glycogen storage, decomposition of red blood cells, and the production of hormones.

If the replacement rate α is set to 20% and XPOS tags are used, T' is:

The NN is an NN only found in NNS which VBZ various NNS, VBZ NNS and VBZ NNS necessary for NN and growth. In humans, it is located in the right upper NN of the NN, below the NN. Its other roles in NN include the NN of NN storage, NN of red blood cells, and the production of NNS.

In the above, with regard to NN, NNS, VBZ, the skilled artisan will be familiar with the Penn Part of Speech Tags and the like.

Considering step 204, suitable software-based parsers and counters can be employed. Considering determining the replacement rate in step 208; for example, make an initial estimate heuristically and then refine iteratively. Step 212 can be implemented, for example, using counters and decision block(s) in a high-level language. Step 216 can be implemented, for example, using text-processing software. For step 220, for example, train on an annotated data set using forward and back propagation in a known manner. Step 224 can be implemented, for example, using decision block(s) in a high-level language. For step 228, for example, prepare a table like FIG. 3 in electronic form and use known techniques to sort for the best Pearson correlation. For step 232, carry out computerized inferencing with the selected language model. Thus, aspects of the invention can be implemented, for example, using custom-written software on a general-purpose computer (e.g., using digital processing and a typical Von Neumann architecture). Some embodiments could also make use of hardware-based solutions, in-memory computing, non-Von Neumann architectures, analog calculations, etc., for machine learning/artificial intelligence aspects.

Experiments

Experiments were conducted using XPOS tags, a conventional training set including four million sentences, and a development set including seven thousand sentences for early stopping. The former data set (of four million sentences) was used for training the system, and the latter data set (of seven thousand sentences) was used as a development/validation dataset. As the training of any large scale machine learning system is time-consuming, the latter data set was used as a technique for early stopping (that is, training was stopped when an improvement in performance of the system on the development dataset set was no longer observed).

In a first evaluation, a sentence acceptability benchmark data set including 2900+ pairs of sentence and sentence rating was used with a Pearson correlation coefficient between evaluation of $f_{acceptability}(S)$ and a human acceptability rating of each sentence S. The human acceptability rating ranged from worst (1.0) to best (3.0). Example sentences include:

"Investigators, some of it under a court order issued in March." Human rating—1.2

"Chefs will celebrate Julia Child's approaching $90^{th}$ birthday." Human rating—3.0

FIG. 3 illustrates the results obtained by varying the replacement rate α from 0% to 100%, in accordance with an example embodiment. Each row of the table of FIG. 3 corresponds to a different word replacement rate, as indicated by the first column of the table. The center column identifies the number of words that are not replaced at the corresponding word replacement rate and the number of available tags (such as 49 tags for XPOS). The third column of the table lists the corresponding Pearson Correlation. As illustrated in FIG. 3, the best performance, as determined using the Pearson Correlation, is with a replacement rate α of 10%.

In a second evaluation, acceptability judgment of sentence pairs in a number of specific domains were performed. The evaluation was performed using a collection of 1,000 sentences in the Finance, Law, and Medicine domains where the root word in the dependency tree of each sentence was removed to construct acceptable and unacceptable sentence pairs. FIG. 4A illustrates an example dependency tree for natural language processing for an acceptable sentence, in accordance with an example embodiment. The acceptable sentence is: "Additionally, infected T cells displayed lower levels of CD45 on their surfaces." As illustrated in the dependency tree, the root word of the acceptable sentence is "displayed." The corresponding unacceptable sentence was obtained by removing the root word ("displayed") from the dependency tree of the acceptable sentence. Thus, the unacceptable sentence is: "Additionally, infected T cells lower levels of CD45 on their surfaces." (Training details include a learning rate of $4\times10^{-5}$, a batch size of 1024, and the use of a conventional optimizer and six modern commercially-available graphical processing units (GPUs).)

FIG. 4B illustrates the results of the evaluation of a domain-specific sentence acceptability judgment task performed on the domains of Finance, Law, and Medicine, in accordance with an example embodiment. (It is noted that the illustrated results are indicative of instance-wise accuracy.) Each row of the table of FIG. 4B corresponds to a different domain-specific sentence acceptability judgment technique. The first row corresponds to a BERT implementation and the second row corresponds to the disclosed hybrid word and tag (XPOS) methodology (with a replacement rate of 10%). The hybrid word and tag (XPOS) methodology performs better than using word only (α=0%) or tag only (α=100%). As illustrated in FIG. 4B, the best performance is with a replacement rate α of 10%.

Given the discussion thus far, it will be appreciated that, in general terms, an exemplary method, according to an aspect of the invention, includes the operations of obtaining, using a hardware processor (for example, a digital hardware processor), a word frequency distribution for a predetermined textual data set (operation 204); determining, using the hardware processor, a replacement rate based on the word frequency distribution (operation 208); replacing, using the hardware processor, in text of a training data set, the training data set comprising at least a portion of the predetermined textual data set, every occurrence of a word having a frequency lower than the replacement rate, with a corresponding tag to generate revised text of the training data set (operation 216); training, using the hardware processor, a plurality of language models with the revised text (operation 220); selecting, using the hardware processor, a best performing trained language model of the plurality of trained language models (operation 228); rating, using the hardware processor, an acceptability of each sentence of a plurality of candidate sentences using the selected trained language model (operation 232); and selecting, using the hardware processor, a best sentence of the plurality of candidate sentences based on the ratings (operation 232).

In one example embodiment, a list of words is obtained, wherein each word in the list has a frequency lower than the replacement rate, to facilitate the replacing step (operation 212).

In one example embodiment, the selecting of the best performing trained language model further comprises evaluating a plurality of the trained language models (operation 220).

In one example embodiment, the determining the replacement rate operation, the replacing operation, and the training operation are repeated for each of a plurality of other replacement rates to generate the plurality of trained language models.

In one example embodiment, in the replacing step, each corresponding tag comprises an English language-specific part-of speech (XPOS) tag.

In one example embodiment, in the replacing step, each corresponding tag comprises a Universal Part-of-speech tag.

In one example embodiment, the predetermined textual data set comprises a data set in a specific domain.

In one example embodiment, an unacceptable sentence for the training data set is generated by removing a root word from an acceptable sentence of the predetermined textual data set.

In one example embodiment, the selected best sentence is utilized as an output of a natural language processing system.

Figure 5:
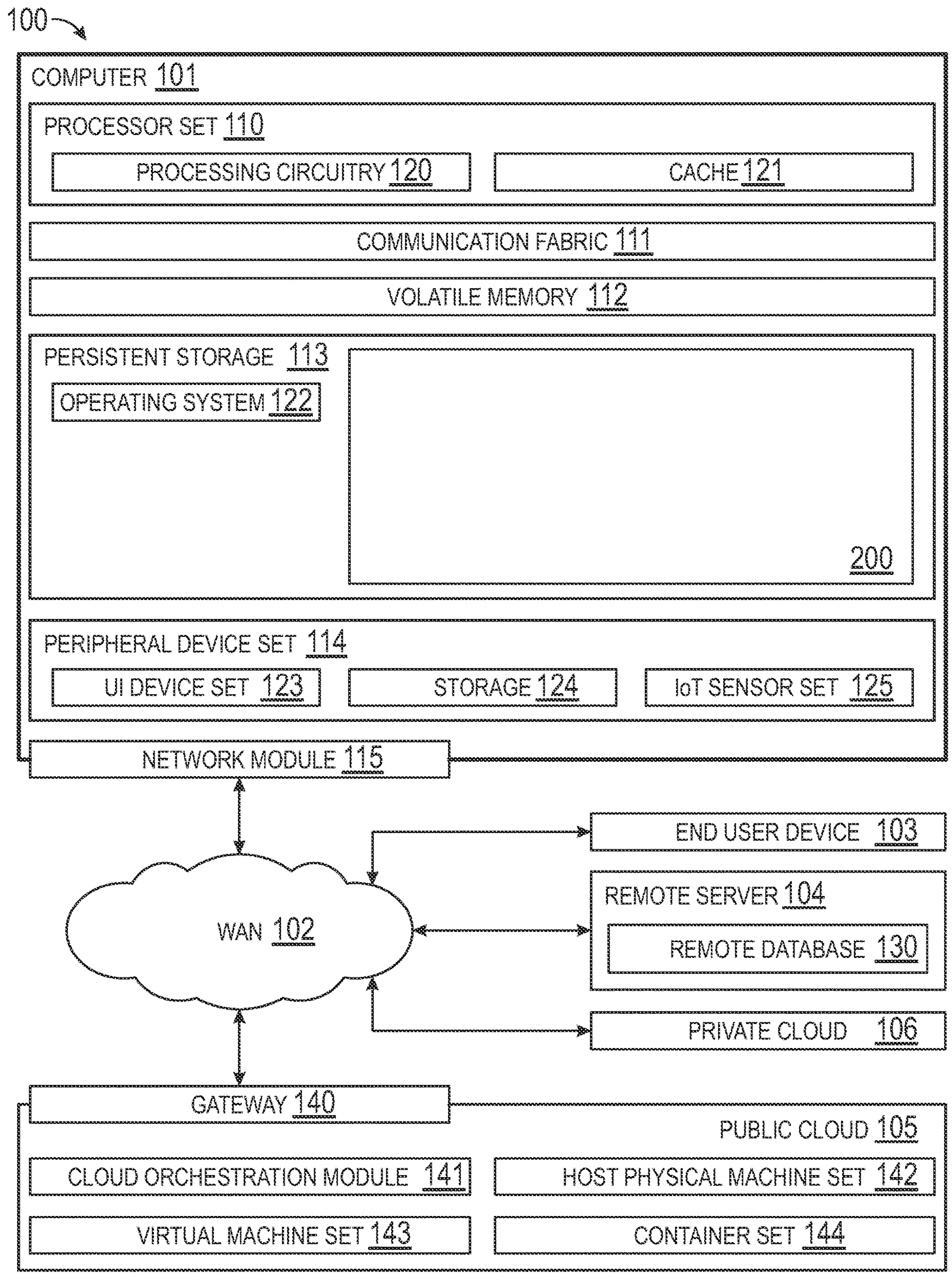
FIG. 5 depicts a computing environment according to an embodiment of the present invention.

In one example embodiment, the natural language processing system is a chatbot and the output of the natural language processing system is a sentence generated by the chatbot. Thus, consider a computer system of a chatbot that generates natural language sentences as a response to a human user. Exemplary embodiments can be used to select the best (most natural) sentence from several candidate sentences generated by the dialogue system. For example, deploy a model trained using aspects of the invention, and use the deployed model to recognize a command to control a physical system. In FIG. 5, for example, a command to a physical system could be sent over the WAN 102 (or over a direct, wired connection, or the like).

In one example embodiment, the output of the natural language processing system is a best sentence of a plurality of sentences generated by a user.

In one aspect, a non-transitory computer readable medium comprises computer executable instructions which when executed by a computer cause the computer to perform the method of obtaining a word frequency distribution for a predetermined textual data set (operation 204); determining a replacement rate based on the word frequency distribution (operation 208); replacing in text of a training data set, the training data set comprising at least a portion of the predetermined textual data set, every occurrence of a word having a frequency lower than the replacement rate, with a corresponding tag to generate revised text of the training data set (operation 216); training a plurality of language models with the revised text (operation 220); selecting a best performing trained language model of the plurality of trained language models (operation 228); rating an acceptability of each sentence of a plurality of candidate sentences using the selected trained language model (operation 232); and selecting a best sentence of the plurality of candidate sentences based on the ratings (operation 232).

In one aspect, an apparatus comprises a memory and at least one processor, coupled to the memory, and operative to perform operations comprising obtaining a word frequency distribution for a predetermined textual data set (operation 204); determining a replacement rate based on the word frequency distribution (operation 208); replacing in text of a training data set, the training data set comprising at least a portion of the predetermined textual data set, every occurrence of a word having a frequency lower than the replacement rate, with a corresponding tag to generate revised text of the training data set (operation 216); training a plurality of language models with the revised text (operation 220); selecting a best performing trained language model of the plurality of trained language models (operation 228); rating an acceptability of each sentence of a plurality of candidate sentences using the selected trained language model (operation 232); and selecting a best sentence of the plurality of candidate sentences based on the ratings (operation 232).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as word-tag-based language system 200 (which, for example, performs aspects of method 201). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 5. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

obtaining, using a hardware processor, a word frequency distribution for a predetermined textual data set;

determining, using the hardware processor, a replacement rate based on the word frequency distribution, wherein the replacement rate is a percentage of words to be replaced with a corresponding tag;

replacing, using the hardware processor, in text of a training data set, the training data set comprising at least a portion of the predetermined textual data set, every occurrence of a word having a frequency lower than the replacement rate, with the corresponding tag to generate revised text of the training data set;

training, using the hardware processor, a plurality of bidirectional encoder representations from transformers language models with the revised text to handle cross-domain natural language processing;

selecting, using the hardware processor, a best performing trained bidirectional encoder representations from transformers language model of the plurality of trained bidirectional encoder representations from transformers language models;

rating, using the hardware processor, an acceptability of each sentence of a plurality of candidate sentences using the selected best performing trained bidirectional encoder representations from transformers language model; and selecting, using the hardware processor, a best sentence of the plurality of candidate sentences based on the ratings.

2. The computer-implemented method of claim 1, further comprising obtaining a list of words, wherein each word in the list has a frequency lower than the replacement rate, to facilitate the replacing step.

3. The computer-implemented method of claim 1, wherein the selecting of the best performing trained bidirectional encoder representations from transformers language model further comprises evaluating the plurality of trained bidirectional encoder representations from transformers language models.

4. The computer-implemented method of claim 1, further comprising repeating the determining the replacement rate operation, the replacing operation, and the training operation for each of a plurality of other replacement rates to generate the plurality of trained bidirectional encoder representations from transformers language models.

5. The computer-implemented method of claim 1, wherein, in the replacing step, each corresponding tag comprises an English language-specific part-of speech (XPOS) tag.

6. The computer-implemented method of claim 1, wherein, in the replacing step, each corresponding tag comprises a universal part-of-speech tag.

7. The computer-implemented method of claim 1, wherein the predetermined textual data set comprises a data set in a specific domain.

8. The computer-implemented method of claim 1, further comprising generating an unacceptable sentence for the training data set by removing a root word from an acceptable sentence of the predetermined textual data set.

9. The computer-implemented method of claim 1, further comprising utilizing the selected best sentence as an output of a natural language processing system.

10. The computer-implemented method of claim 9, wherein the natural language processing system comprises a chatbot and wherein the output of the natural language processing system is a sentence generated by the chatbot.

11. The computer-implemented method of claim 9, wherein the output of the natural language processing system is a best sentence of a plurality of sentences generated by a user.

12. A non-transitory computer readable medium comprising computer executable instructions which when executed by a computer cause the computer to perform the method of:

obtaining a word frequency distribution for a predetermined textual data set;

determining a replacement rate based on the word frequency distribution, wherein the replacement rate is a percentage of words to be replaced with a corresponding tag;

replacing in text of a training data set, the training data set comprising at least a portion of the predetermined textual data set, every occurrence of a word having a frequency lower than the replacement rate, with the corresponding tag to generate revised text of the training data set;

training a plurality of bidirectional encoder representations from transformers language models with the revised text to handle cross-domain natural language processing;

selecting a best performing trained bidirectional encoder representations from transformers language model of the plurality of trained bidirectional encoder representations from transformers language models;

rating an acceptability of each sentence of a plurality of candidate sentences using the selected performing trained bidirectional encoder representations from transformers language model; and selecting a best sentence of the plurality of candidate sentences based on the ratings.

13. An apparatus comprising:

a memory; and at least one processor, coupled to said memory, and operative to perform operations comprising:

obtaining a word frequency distribution for a predetermined textual data set;

determining a replacement rate based on the word frequency distribution, wherein the replacement rate is a percentage of words to be replaced with a corresponding tag;

replacing in text of a training data set, the training data set comprising at least a portion of the predetermined textual data set, every occurrence of a word having a frequency lower than the replacement rate, with the corresponding tag to generate revised text of the training data set;

training a plurality of bidirectional encoder representations from transformers language models with the revised text to handle cross-domain natural language processing;

selecting a best performing trained bidirectional encoder representations from transformers language model of the plurality of trained bidirectional encoder representations from transformers language models;

rating an acceptability of each sentence of a plurality of candidate sentences using the selected best performing trained bidirectional encoder representations from transformers language model; and selecting a best sentence of the plurality of candidate sentences based on the ratings.

14. The apparatus of claim 13, the operations further comprising obtaining a list of words, wherein each word in the list has a frequency lower than the replacement rate, to facilitate the replacing step.

15. The apparatus of claim 13, wherein the selecting of the best performing trained bidirectional encoder representations from transformers language model further comprises evaluating the plurality of trained bidirectional encoder representations from transformers language models.

16. The apparatus of claim 13, the operations further comprising repeating the determining the replacement rate operation, the replacing operation, and the training operation for each of a plurality of other replacement rates to generate the plurality of trained bidirectional encoder representations from transformers language models.

17. The apparatus of claim 13, wherein, in the replacing step, each corresponding tag comprises an English language-specific part-of speech (XPOS) tag.

18. The apparatus of claim 13, wherein the predetermined textual data set comprises a data set in a specific domain.

19. The apparatus of claim 13, the operations further comprising generating an unacceptable sentence for the training data set by removing a root word from an acceptable sentence of the predetermined textual data set.

20. The apparatus of claim 13, the operations further comprising utilizing the selected best sentence as an output of a natural language processing system.

* * * * *